(12) United States Patent
Oriet et al.

(10) Patent No.: US 8,215,707 B2
(45) Date of Patent: Jul. 10, 2012

(54) EXTRUDED CORNISH OF A MOTOR BUS BODY

(75) Inventors: Leo P. Oriet, Rochester Hills, MI (US); Jules Cazabon, Staples (CA); Michael D. Roeth, Fort Wayne, IN (US); John W. Randall, Fort Wayne, IN (US)

(73) Assignee: Navistar Canada, Inc. (CA)

( * ) Notice: Subject to any disclaimer, the term of this patent is extended or adjusted under 35 U.S.C. 154(b) by 513 days.

(21) Appl. No.: 12/490,712

(22) Filed: Jun. 24, 2009

(65) Prior Publication Data

US 2010/0327617 A1 Dec. 30, 2010

(51) Int. Cl.
*B60J 7/00* (2006.01)

(52) U.S. Cl. ...................................... 296/208

(58) Field of Classification Search ............. 296/208, 296/146.2, 29, 191, 190.09, 179, 186.1; 156/244.13; 52/302.1, 302.3
See application file for complete search history.

(56) References Cited

U.S. PATENT DOCUMENTS

| | | | | |
|---|---|---|---|---|
| 3,712,005 A | * | 1/1973 | Eschbach et al. | 52/210 |
| 3,866,381 A | * | 2/1975 | Eschbach et al. | 52/766 |
| 4,004,373 A | * | 1/1977 | Eschbach et al. | 49/413 |
| 4,148,515 A | | 4/1979 | Knap | |
| 4,574,336 A | * | 3/1986 | Mikalonis | 362/479 |
| 5,204,149 A | * | 4/1993 | Phenicie et al. | 428/57 |
| 5,267,515 A | | 12/1993 | Tsuruda | |
| 5,452,678 A | * | 9/1995 | Simpkins | 114/361 |
| 5,466,058 A | * | 11/1995 | Chan | 312/111 |
| 5,718,276 A | * | 2/1998 | Rekret | 160/201 |
| 6,003,898 A | | 12/1999 | Teply | |
| 6,123,378 A | | 9/2000 | Teply | |
| 6,139,094 A | | 10/2000 | Teply | |
| 6,412,243 B1 | * | 7/2002 | Sutelan | 52/309.7 |
| 6,499,797 B1 | * | 12/2002 | Bohm et al. | 296/191 |
| 6,502,895 B2 | * | 1/2003 | Taylor | 296/178 |
| 6,669,553 B2 | * | 12/2003 | Adams | 454/237 |
| 6,719,360 B1 | * | 4/2004 | Backs | 296/186.1 |
| 6,827,472 B1 | * | 12/2004 | Myburgh | 362/480 |
| 6,854,789 B2 | * | 2/2005 | Kloepfer | 296/183.2 |
| 7,305,923 B2 | * | 12/2007 | Creighton et al. | 105/404 |
| 7,648,190 B2 | * | 1/2010 | Timmermans et al. | 296/178 |
| 7,862,101 B2 | * | 1/2011 | Lusk et al. | 296/178 |
| 7,993,719 B2 | * | 8/2011 | Stanton | 428/57 |
| 2008/0143142 A1 | * | 6/2008 | Lemmons | 296/186.1 |
| 2009/0256392 A1 | * | 10/2009 | Buda et al. | 296/190.02 |
| 2009/0321023 A1 | * | 12/2009 | Curry, III | 160/133 |
| 2010/0000178 A1 | * | 1/2010 | Eggert et al. | 52/745.19 |
| 2010/0043339 A1 | * | 2/2010 | Van Dijk | 52/653.2 |
| 2010/0107530 A1 | * | 5/2010 | Pietruczynik et al. | 52/313 |
| 2010/0140980 A1 | * | 6/2010 | Stanton | 296/203.01 |
| 2011/0284195 A1 | * | 11/2011 | Chowdhury et al. | 165/174 |

* cited by examiner

*Primary Examiner* — Kiran B Patel
(74) *Attorney, Agent, or Firm* — Jeffrey P. Calfa; Mark C. Bach

(57) ABSTRACT

A motor bus body (8) has multiple wall extrusions (18, 48) that join respective sides to the roof (16). Each extrusion has an exterior wall (20) that when viewed lengthwise of the extrusion is concave toward an interior passenger space (10) and convex away from the interior passenger space to form a rounded exterior corner of the body. The extrusion also comprises an interior wall (22) that is concave toward the exterior wall (20) and that cooperates with the exterior wall to enclose a space that contains additional walls (36, 38) of the extrusion joining with the interior and exterior walls (20, 22).

14 Claims, 3 Drawing Sheets

EXTRUDED CORNISH OF A MOTOR BUS BODY

FIELD OF THE INVENTION

This invention relates to motor bus bodies, such as school bus bodies. The invention particularly relates to an extruded cornish forming a strong, but lightweight, structural member that runs lengthwise along the top of a vertical wall separating interior passenger space from the exterior and joins that wall to the body's roof.

BACKGROUND OF THE INVENTION

The school bus manufacturing industry fabricates bus bodies using a "stick framing" process. That process is heavily labor- and part-intensive. Actual fabrication process sheets call for specific operations too numerous to mention here; hence only a general overview of the process will be given as background.

A number of bows are fabricated and installed at intervals along the length of the bus body. Fixtures for locating and holding the bows are placed on seat rails that run along opposite sides of the floor. The bows are manually placed in the fixtures and preliminarily fastened in place. Drip rails and bow spacers are located to the bows using other fixtures. The preliminarily assembled parts are checked for squareness and fit, adjusted as needed, and checked again before parts are finally joined together using fasteners and welding. Trimming of certain parts may then be performed.

At some point in the process, windows are installed between bows, the body sides are closed by exterior side panels, and the open top of the body is capped by fitting the roof onto the bows and fastening it in place.

Certain bus specifications call for reinforcement of the bows in various ways, adding more steps and parts to the fabrication process.

As commercial vehicles, busses are typically subjected to regular daily use. Some school buses operate in rural areas where roads are often unimproved. Some busses operate under extreme weather conditions. Consequently, the recognition that busses must provide a reasonable service life in these circumstances calls for them to be sturdily built.

SUMMARY OF THE INVENTION

In furtherance of that objective, the present invention provides a structural element that significantly reduces the number of individual parts and the number of individual operations in the fabrication of a motor bus body. The inventors believe that reductions of as much as about 50% are attainable, depending on the particular manufacturer.

This structural element has a generic character that can be made specific to fit existing bus body designs that are used by various manufacturers. The element comprises a multiple wall extrusion in which the individual walls are arranged in a particular way that allows the element to be used as a member that integrates the rounded portion of the exterior skin running along the length of the bus body between a generally vertical side and the generally horizontal roof with strong underlying structure that can also function as part of an air delivery system and/or a conduit for routing electric wire harnesses. The use of the word "Cornish" to occasionally describe the element has been prompted by the inventors' perception of the exterior skin that falls away from the roof as reminful of the rounded edge of a ski jump that allows a skier to become temporarily airborne when gliding down a slope.

Fabricating this structural element by extrusion provides benefits that include good formability, quality surface finish, medium strength when heat treated, and cost-effectiveness. Because of its seamless character, water leaks that might occur in non-seamless designs are avoided.

The process of fabricating the extrusion comprises providing a die of proper shape, and thoroughly pre-heating it prior to extruding the raw material. State-of-the-art pre-heating using an infra-red, single-cell die oven can make a cold die ready for production in as little as 1½ hours, thereby supporting lean manufacturing initiatives.

Each of four of the most common 6000-series aluminum alloys has distinct advantages to the end-use application in a bus body. Alloy selection varies based on the specific requirements in strength, weldability, forming characteristics, finish, corrosion resistance, machinability and other expectations of the school bus marketplace. A given extrusion design may have several suitable alloys for the fit, form and function of the finished product. It is recommended that alloy selection be based on the structural or fabrication requirements as well as economics. Certain alloys are functionally equivalent to others but may offer cost advantages.

Solution heat treatment is performed by maintaining the proper exit temperature as the extrusion emerges from the press during the extrusion process and then quenching it at the proper rate. These temperatures and rates vary by alloy. Holding the extrusions at the proper temperature allows the aluminum, along with any alloying elements, to enter into a solid solution. Rapid cooling, or "quenching" of the extrusion, holds these constituents in solution.

When the extrusion is cut to desired length for end use based on the full length of the bus, it is a single part ready to be used in body fabrication instead of traditional "stick framing". In addition to providing part of the structural framework of the body, the extrusion can serve as a conduit for heating and cooling systems and side glass defrosting systems.

Because of the simplification of the body fabrication process that is provided by the invention, improvements in ergonomics and safety at a fabrication facility may be side benefits of adopting the invention.

The present invention provides a motor vehicle body with a lightweight structural member that has been fabricated by extruding aluminum or aluminum alloy through an extrusion die using conventional extrusion technology. The extrusion is cut to length appropriate to the length of the body to be built. As viewed lengthwise, the extrusion comprises an exterior wall that is concave toward an interior wall that is itself concave to the exterior wall. The interior and exterior walls join together to enclose a space that contains additional walls of the extrusion joining with the interior and exterior walls.

The exterior surface of the exterior wall forms a rounded corner of the body running front to rear.

The extrusion also has flanges for fitting to the roof and side wall and a drip rail extending outward from the exterior wall to catch water runoff from the roof so that it doesn't wash across windows in the side wall.

The extrusion may be used on both right and left sides of the body with the extrusion on each side being arranged as the mirror image of the one on the other side, as viewed lengthwise of the body.

The extrusion also has an intermediate wall that cooperates with the interior wall to enclose a portion of the space enclosed by the interior and exterior walls. The interior wall comprises through-openings spaced along the length of the extrusion. Ducts communicate via these through-openings with the portion of the space enclosed by the interior and exterior walls.

An air delivery system delivers air through these ducts to the portion of the space enclosed by the interior and exterior walls. The interior wall includes outlet openings through which air that has been delivered into the portion of the space enclosed by the interior and exterior walls is discharged into interior passenger space in the body.

The space inside the extrusion allows electrical wiring to run through the extrusion. The wiring can enter and exit through ends of the extrusion and/or through-holes in the interior or exterior walls.

One general aspect of the invention therefore relates to a motor vehicle body comprising a roof, a side, and a multiple wall extrusion. The extrusion comprises an exterior wall that when viewed lengthwise of the extrusion, is concave toward an interior passenger space and disposed between the roof and the side to form a corner of the body. The extrusion also comprises an interior wall that is concave toward the exterior wall and that cooperates with the exterior wall to enclose a space that contains additional walls of the extrusion joining with the interior and exterior walls.

A further aspect of the invention relates to a motor bus body comprising a multiple wall extrusion that joins a vertical side panel and a horizontal roof panel of the body. The extrusion comprises an exterior wall that when viewed lengthwise of the extrusion is concave toward an interior passenger space of the body and convex away from the interior passenger space to form a rounded exterior corner of the body. The extrusion also comprises an interior wall that is concave toward the exterior wall and that cooperates with the exterior wall to enclose a space that contains additional walls of the extrusion joining with the interior and exterior walls.

The foregoing, along with further features and advantages of the invention, will be seen in the following disclosure of a presently preferred embodiment of the invention depicting the best mode contemplated at this time for carrying out the invention. This specification includes drawings, now briefly described as follows.

DESCRIPTION OF THE PREFERRED EMBODIMENT

Figure 1:
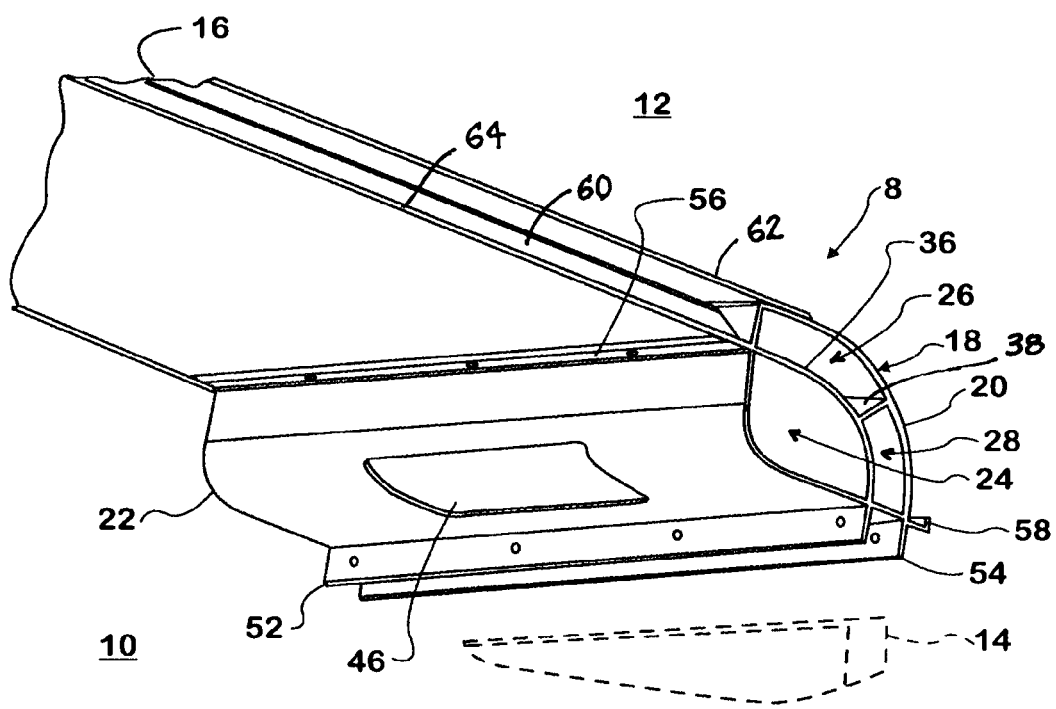
FIG. 1 is a fragmentary perspective view of a portion of the interior passenger space of a motor bus, with portions broken away, to show structure embodying principles of the present invention.

The drawings show a portion of the wall structure of a motor bus body 8 that encloses an interior passenger space 10 to separate that space from the exterior 12. The illustrated wall structure joins a side wall 14 and a roof 16.

Pursuant to principles of the invention, a multiple wall extrusion 18 joins side wall 14 and roof 16 along the full length of body 8. In end view (FIG. 4), extrusion 18 comprises an exterior wall 20 that is concave toward passenger space 10 and convex toward exterior 12 to form a rounded corner of body 8 between roof 16 and side wall 14. Extrusion 18 also has an interior wall 22 that is concave toward exterior wall 20 and that cooperates with the latter to enclose a space that contains additional walls of the extrusion joining with walls 20, 22 to partition the interior into three distinct spaces 24, 26, 28.

Figure 4:
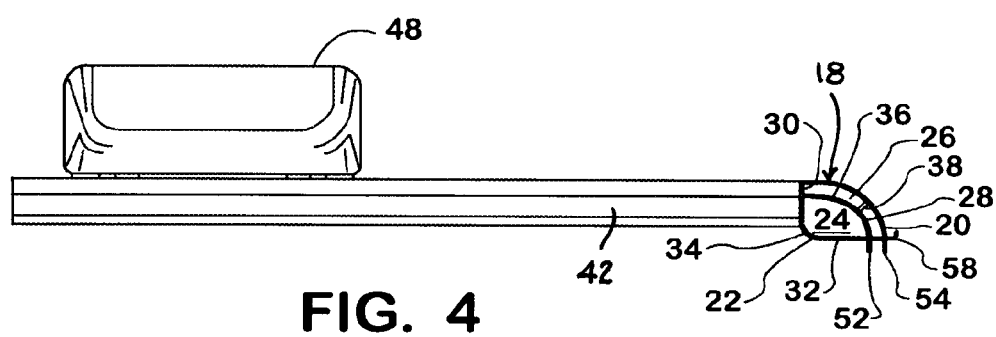
FIG. 4 is an end elevation view in the direction of arrow 4 in FIG. 3.

Interior wall 22 has generally flat vertical and horizontal margins, marked by the reference numerals 30, 32 respectively in FIG. 4, that extend from a 90° bend 34. The additional walls comprise an intermediate wall 36 that is convex toward exterior wall 20 and concave toward interior wall 22, and a bridge wall 38 that bridges intermediate wall 36 to exterior wall 20. Bridge wall 38 is spaced from both roof 16 and side wall 14 and, as shown in the end view of FIG. 4, lies in a plane that is at about 45° to the horizontal. Intermediate wall 36 cooperates with a portion of interior wall 22 to enclose space 24. Space 26 is bounded by a portion of margin 30 of interior wall 22, bridge wall 38, and portions of exterior wall 20 and intermediate wall 36. Space 28 is bounded by a portion of margin 32 of interior wall 22, bridge wall 38, and portions of exterior wall 20 and intermediate wall 36.

Figure 2:
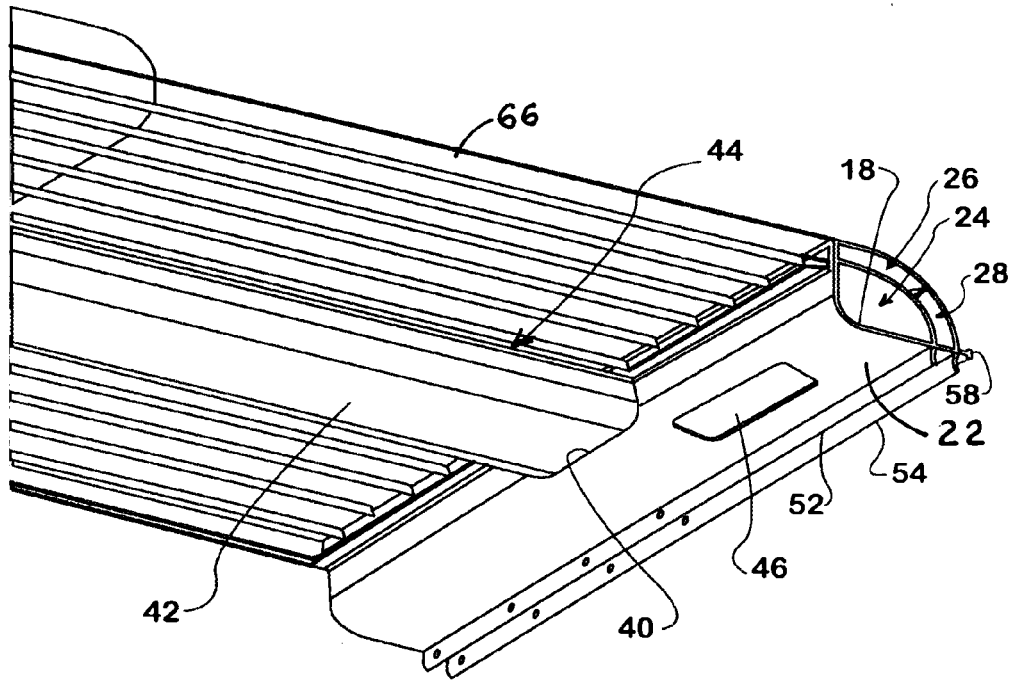
FIG. 2 is a view similar to FIG. 1 showing additional structural features.
Figure 3:
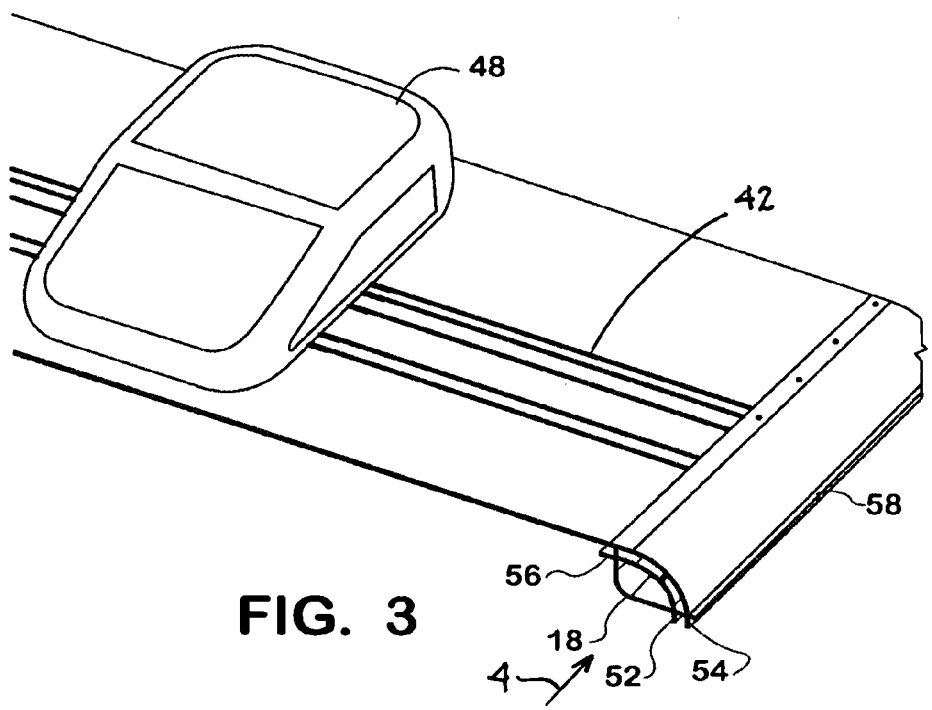
FIG. 3 is a fragmentary perspective view of a portion of a roof of the motor bus, with portions broken away, to show structure embodying principles of the present invention.

FIG. 2 shows that interior wall 22 comprises a through-opening 40 which is one of several through-openings 40 spaced along the length of the extrusion. A duct 42, shown in FIGS. 2, 3, and 4, communicates via the illustrated through-opening 40 with space 24. Duct 42 is a portion of an air delivery system 44 that delivers air through the duct to space 24. Interior wall 22 further includes outlet openings 46 (FIGS. 1 and 2) through which air that has been delivered into space 24 by air delivery system 44 is discharged into passenger space 10.

Air delivery system 44 comprises a roof-mounted climate control unit 48 (FIGS. 3-5) that can deliver heated and/or cooled air depending on need. A duct 42 that also serves as a structural member can be attached to extrusion 18 and to a second extrusion 50 (see FIG. 5) on the opposite side of body 8 to provide underlying support for climate control unit 48. The second extrusion 50 has the same profile as extrusion 18, advantageously allowing both right- and left-parts to be extruded by the same extrusion die, but is arranged in body 8 as the mirror image of extrusion 18.

Each extrusion further comprises flanges for fitting the extrusion to roof 16 and to a respective side wall of body 8. Flange 52 depends vertically downward from a location where intermediate wall 36 joins with margin 32 of interior wall 22. Flange 54 depends vertically downward from a location where exterior wall 20 joins with wall margin 32. Flanges 52 and 54 are spaced apart parallel so that they and the portion of wall margin 32 between them form a downwardly open throat that fits onto side wall 14 of body 8.

A flange 56 for attachment to roof structure extends horizontally inward from a location where intermediate wall 36 joins with margin 30 of interior wall 22.

Each extrusion further comprises a drip rail 58 on the face of exterior wall 20 that is toward exterior 12 to create an upwardly open channel for catching and carrying away water runoff from roof 16 so that the water doesn't wash across windows in side wall 14. Drip rail 58 is on the exterior of body 8 directly opposite margin 32 which is interior to extrusion 18.

The rigid structure that the extrusions 18, 50 provide leaves the in-process bus body with an open top that is eventually closed by any of various roof structures. Examples of such structures are shown in several Figures.

Figure 5:
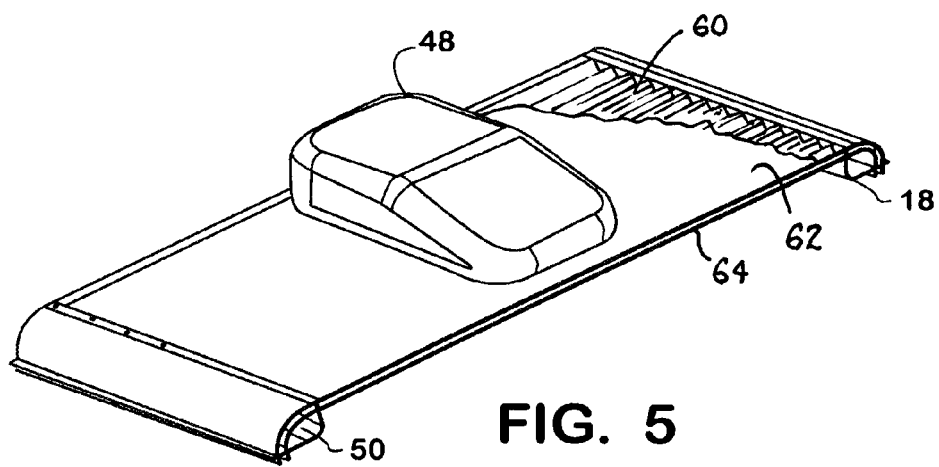
FIG. 5 is a fragmentary perspective view of another portion of a roof of the motor bus.

FIGS. 1 and 5 show an accordion shade 60 captured between transparent panels 62, 64. FIG. 2 shows panels 66 containing photochromic layers that can be controlled electrically to vary light transmission through the panels. Roof 16 can also comprise solar panels and insulation panels. A roof can also be a combination of different panels.

While a presently preferred embodiment of the invention has been illustrated and described, it should be appreciated that principles of the invention apply to all embodiments falling within the scope of the following claims.

What is claimed is:

1. A motor vehicle body comprising:
   a roof,
   a side wall, and
   a multiple wall extrusion comprising an exterior wall that when viewed lengthwise of the extrusion, is concave toward an interior of the motor vehicle body and disposed between the roof and the side wall to form a corner of the motor vehicle body, an interior wall that is concave toward the exterior wall and that cooperates with the exterior wall to enclose a space that contains additional walls of the multiple wall extrusion joining with the interior and exterior walls,
   wherein the additional walls comprise an intermediate wall that is convex toward the exterior wall and concave toward the interior wall and a bridge wall that is spaced from both the roof and the side wall of the motor vehicle body and bridges the intermediate wall to the exterior wall, and
   wherein the intermediate wall cooperates with the interior wall to enclose a portion of the space enclosed by the interior and exterior walls, the interior wall comprises a through-opening, and further including a duct that communicates via the through-opening with the portion of the space enclosed by cooperation of the intermediate wall with the interior wall.

2. A motor vehicle body as set forth in claim 1 wherein the bridge wall lies in a plane that is at about 45° to the horizontal.

3. A motor vehicle body as set forth in claim 1 including an air delivery system that delivers air through the duct to the portion of the space enclosed by cooperation of the intermediate wall with the interior wall, and wherein the interior wall further includes outlet openings for air that has been delivered into the portion of the space enclosed by cooperation of the intermediate wall with the interior wall to be discharged into the interior of the motor vehicle body.

4. A motor vehicle body as set forth in claim 3 wherein the air delivery system comprises a roof-mounted unit for delivering air into the duct, and in which the duct provides underlying support for the roof-mounted unit.

5. A motor vehicle body as set forth in claim 1 wherein the multiple wall extrusion's length runs parallel with the length of the motor vehicle body along one side of the motor vehicle body, and further including a second multiple wall extrusion in the mirror image of the first-mentioned multiple wall extrusion whose length runs parallel with the length of the motor vehicle body along an opposite side of the motor vehicle body.

6. A motor vehicle body as set forth in claim 5 wherein the roof comprises a panel spanning width of the motor vehicle body between the multiple wall extrusions.

7. A motor vehicle body as set forth in claim 6 wherein the panel comprises a transparent panel and a device for controlling light transmission through the transparent panel.

8. A motor vehicle body as set forth in claim 1 wherein the multiple wall extrusion further comprises flanges for fitting the multiple wall extrusion to the roof and to the side wall.

9. A motor vehicle body as set forth in claim 8 wherein one of the flanges depends vertically downward from a location where the intermediate wall joins a horizontal portion of the interior wall, and another of the flanges depends vertically downward from a location where the interior wall joins the exterior wall and is spaced outward from the one flange so that the one flange, the another flange, and the horizontal portion of the interior wall form a downwardly open throat that fits onto the side wall of the motor vehicle body.

10. A motor vehicle body as set forth in claim 8 wherein the multiple wall extrusion further comprises a drip rail forming an upwardly open channel on an exterior face of the exterior wall.

11. A motor bus body which encloses an interior passenger space and comprises:
    a vertical side wall;
    a horizontal roof; and
    a multiple wall extrusion that joins the vertical side wall and the horizontal roof, the multiple wall extrusion comprising
    an exterior wall that, when viewed lengthwise of the multiple wall extrusion, is concave toward the interior passenger space of the motor bus body and convex away from the interior passenger space to form a rounded exterior corner of the motor bus body, an interior wall that is concave toward the exterior wall and that cooperates with the exterior wall to enclose a space that contains additional walls of the multiple wall extrusion joining with the interior wall and the exterior wall, the additional walls comprising an intermediate wall that is convex toward the exterior wall and concave toward the interior wall, and a bridge wall that bridges the intermediate wall to the exterior wall.

12. A motor bus body as set forth in claim 11 wherein the multiple wall extrusion further comprises a drip rail forming an upwardly open channel on an exterior face of the exterior wall.

13. A motor bus body as set forth in claim 11 wherein the multiple wall extrusion further comprises one or more flanges for fitting the multiple wall extrusion to one or more of the horizontal roof and the vertical side wall.

14. A motor bus body as set forth in claim 11 wherein material of the multiple wall extrusion comprises aluminum or an aluminum alloy.

\* \* \* \* \*